United States Patent
Savithri et al.

(10) Patent No.: US 7,441,218 B2
(45) Date of Patent: Oct. 21, 2008

(54) CONTACT RESISTANCE AND CAPACITANCE FOR SEMICONDUCTOR DEVICES

(75) Inventors: Nagaraj N. Savithri, Dallas, TX (US); Dharin Nayeshbhai Shah, Gujarat (IN); Girishankar Gurumurthy, Chennai (IN)

(73) Assignee: Texas Instruments Incorporated, Dallas, TX (US)

( * ) Notice: Subject to any disclaimer, the term of this patent is extended or adjusted under 35 U.S.C. 154(b) by 230 days.

(21) Appl. No.: 11/440,657

(22) Filed: May 24, 2006

(65) Prior Publication Data
US 2007/0277137 A1 Nov. 29, 2007

(51) Int. Cl.
*G06F 17/50* (2006.01)
(52) U.S. Cl. .............................. 716/10; 716/9
(58) Field of Classification Search ................ 716/8–12
See application file for complete search history.

(56) References Cited

U.S. PATENT DOCUMENTS

| | | | |
|---|---|---|---|
| 6,519,745 B1 * | 2/2003 | Srinivas et al. ................ 716/5 |
| 6,567,967 B2 * | 5/2003 | Greidinger et al. ............ 716/10 |
| 6,609,235 B2 | 8/2003 | Ramaswamy et al. | |
| 6,815,982 B2 | 11/2004 | Buhr | |
| 7,124,386 B2 * | 10/2006 | Smith et al. .................... 716/10 |
| 7,328,419 B2 * | 2/2008 | Vuong et al. ................... 716/11 |

* cited by examiner

*Primary Examiner*—Jack Chiang
*Assistant Examiner*—Binh C Tat
(74) *Attorney, Agent, or Firm*—Wade J. Brady, III; Frederick J. Telecky, Jr.

(57) ABSTRACT

A method generates a design layout for an integrated circuit. A design is provided for an integrated circuit. Library cells are selected according to the design. The library cells are mapped into a chip area map. Unmapped cells are filled with filler cells. Critical cells of the library cells are selected. The selected critical cells are altered with respect to contact resistance and/or contact capacitance. The map including the altered cells is provided as the design layout.

11 Claims, 6 Drawing Sheets

CONTACT RESISTANCE AND CAPACITANCE FOR SEMICONDUCTOR DEVICES

FIELD OF INVENTION

The present invention relates generally to semiconductor devices and more particularly to methods for reducing contact resistance and contact capacitance for a subset of cells to improve overall device performance.

BACKGROUND OF THE INVENTION

Integrated circuits can be formed as semiconductor devices on a die of a wafer. The die can have large numbers and types of devices formed therein, such as memory, logic circuits, amplifiers, inverters, transistors, and the like. The organization of these devices on a die is referred to as a layout or device layout.

The device layout for a given die can be organized in cells, which comprise individual units for devices. For example, a cell can comprise circuits such as a particular logic device, an amplifier, and the like or individual or groups of components such as transistors, inverters, capacitors, and the like. Standardized cell designs, also referred to as library cells, can be employed in the layout process. Additionally, blank or filler cells can also be employed to mitigate dishing and/or other problems during fabrication. Layouts can be designed by identifying or selecting cells for a particular die and arranging the cells on the die.

A continuing trend for semiconductor device fabrication and integrated circuit fabrication is to reduce device sizes and dimensions. So doing increases the density of devices on devices and leads to cost savings and performance enhancement. However, contact resistance and/or contact capacitance tend to increase with every reduction in scale, also referred to as technology node. Contact resistance and/or contact capacitance have a significant impact upon circuit performance. Thus, continued scaling of devices can result in decreased device performance.

Conventional layout design typically only considers which cells to include for a given design layout and is not concerned with contact resistance and/or contact capacitance. Thus, continued scaling of devices can result in integrated circuits with lowered performance.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention facilitates semiconductor device performance by reducing contact resistance and/or contact capacitance for select cells within design layouts. The select cells are analyzed and their contact capacitance and/or contact resistance can then be reduced, thereby reducing contact resistance and contact capacitance overall for an integrated circuit and design. Overall performance for the integrated circuit can thus be enhanced.

In accordance with one aspect of the invention, a method generates a design layout for an integrated circuit. A design is provided for an integrated circuit. Library cells are selected according to the design. The library cells are mapped into a chip area map. Unmapped cells are filled with filler cells. Critical cells of the library cells are selected. The selected critical cells are altered with respect to contact resistance and/or contact capacitance. The map including the altered cells is provided as the design layout.

In accordance with one aspect of the invention, a method generates a design layout for an integrated circuit. A design is provided for an integrated circuit. The design is analyzed for critical paths and/or components. Low contact cells, which are cells having low parasitic characteristics, are selected for the identified critical paths. Library cells are selected for remaining portions of the design. The library cells and the low contact cells are mapped into a cell map. Filler cells are mapped into unused cells of the cell map. The cell map can then be provided as a design layout. Other systems, methods, and variations thereof are disclosed.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

One or more aspects of the present invention are described with reference to the drawings, wherein like reference numerals are generally utilized to refer to like elements throughout, and wherein the various structures are not necessarily drawn to scale. It will be appreciated that where like acts, events, elements, layers, structures, etc. are reproduced, subsequent (redundant) discussions of the same may be omitted for the sake of brevity. In the following description, for purposes of explanation, numerous specific details are set forth in order to provide a thorough understanding of one or more aspects of the present invention. It may be evident, however, to one of ordinary skill in the art that one or more aspects of the present invention may be practiced with a lesser degree of these specific details. In other instances, known structures are shown in diagrammatic form in order to facilitate describing one or more aspects of the present invention.

The present invention facilitates semiconductor device fabrication by improving performance for integrated circuits. Selected cells for integrated circuits can be adjusted or replaced in order to reduce contact resistance and/or contact capacitance. As a result, performance for integrated circuits can be improved.

Contact resistance and contact capacitance tend to increase as semiconductor devices are reduced. This is due, at least in part, to shrinking dimensions, smaller contact sizes, reduced contact to contact spacing, reduced contact to gate spacing, and the like. Increases in contact resistance and/or contact capacitance tend to impair and/or slow overall device performance and can limit and/or prevent further scaling of semiconductor devices.

Aspects of the present invention facilitate semiconductor device performance by selecting critical cells that substantially impact overall performance of the device. These critical cells can then be altered and/or replaced, as shown below, so as to have lower contact resistance and/or contact capacitance. The semiconductor device, as a result, can have improved performance.

Figure 1A:
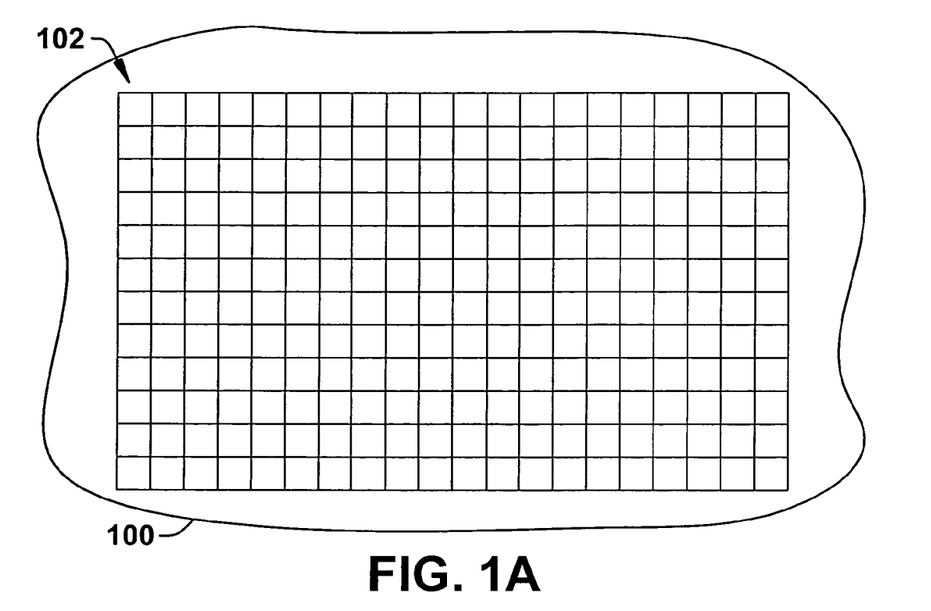
FIG. 1A is a diagram illustrating a cell map for a design layout of an integrated circuit in accordance with an aspect of the invention.

Turning now to FIG. 1A, a diagram of cell map 100 for a design layout of an integrated circuit in accordance with an aspect of the invention is shown. The cell map 100 is provided for illustrative purposes and is provided as merely an example of possible cell maps that can be employed in accordance with aspects of the invention.

The cell map 100 includes a plurality of cells 102, which are currently empty. The cells 102 correspond to regions or areas of a semiconductor die onto which devices are to be fabricated forming the integrated circuit. The cells 102 are shown as squares having substantially similar sizes. It is appreciated that aspects of the invention can include cells of other shapes and varied sizes.

Figure 1B:
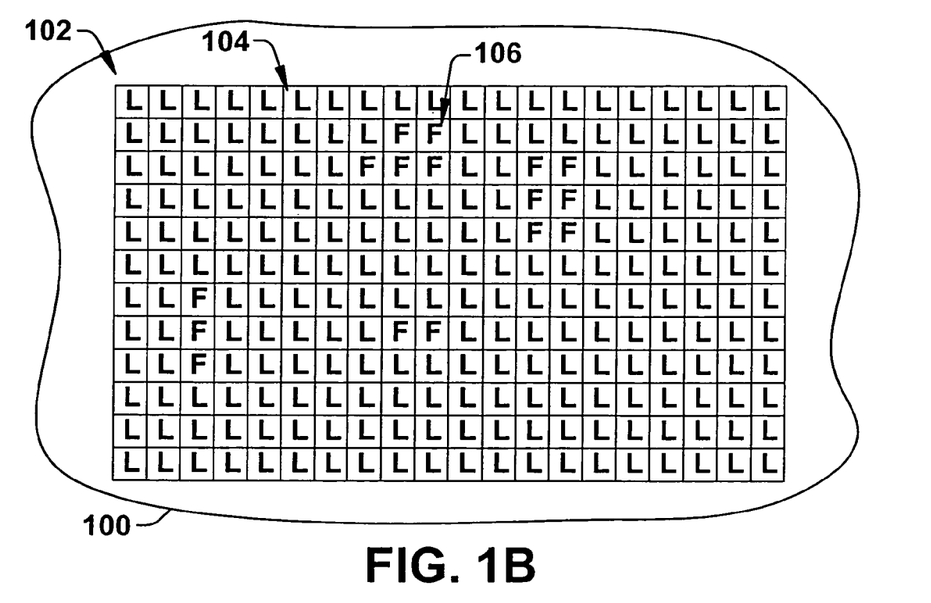
FIG. 1B is another diagram illustrating a cell map with library cells and filler cells for a design layout of an integrated circuit in accordance with an aspect of the invention.

FIG. 1B is another diagram illustrating the cell map 100 with library cells and filler cells for a design layout of an integrated circuit in accordance with an aspect of the invention. The cell map 100 is also provided for illustrative purposes and is provided merely as an example of possible cell maps that can be employed in accordance with aspects of the invention.

The cell map 100 is substantially similar to that shown in FIG. 1A, except that library cells 104 and filler cells 106 have been inserted into the cells 102 of the cell map. The library cells 104 have a form factor that matches the cells 102 and include fabrication dimensions, layers, process parameters, processes to be employed, thermal budgets, and the like for particular semiconductor devices to be formed in the cells 102. The library cells 104 can correspond to a variety of semiconductor devices including, for example, buffer cells, clock buffer cells, inverter cells, memory cells, and the like. Some examples of other library cells include, for example, cells for flip-flops, register files, complex logic functions and custom macros. Thus, the library cells 104 are selected according to circuits and/or components present in a design of the integrated circuit and can correspond to individual circuits or paths of the design.

The library cells 104 also have resistance and capacitance characteristics associated therewith. Some of these resistance and capacitance characteristics are inherent in the semiconductor devices themselves. However, other resistance and capacitance characteristics, referred to as parasitic resistance and parasitic capacitance or, for both, parasitics, are typically present. The parasitics can result from contacts, vias, lines, plugs, metallization layers, polysilicon layers, and the like. The parasitics are generally undesirable and can hinder device performance. The parasitics of library cells 104 can be a significant portion, for example more than 50 percent, of the overall capacitance and resistance characteristics of the library cells 104.

These parasitic properties can be arranged in intra-cell parasitics, which are within library cells and inter-cell parasitics, which are parasitics between library cells. The intra-cell parasitics comprise parasitic capacitance from, for example, contact to gate, polysilicon layers, metal layer parasitics for one or more metal layers and the like. The intra-cell parasitics comprise parasitic resistance from, for example, contacts, vias, polysilicon layers, one or more metallization layers, and the like. The inter-cell parasitics comprise parsitic capacitance, for example, resulting from multiple metallization layers and the like. The inter-cell parasitics comprise parasitic resistance, for example, from multiple metallization layers, vias, contacts, and the like.

The filler cells 106 are inserted to occupy unused cells. The filler cells 106 do not in and of themselves perform a function with respect to logic or circuit performance, but facilitate fabrication of surrounding library cells. The filler cells 106 can comprise layers and components in order to facilitate fabrication of the integrated circuit overall. The filler cells 106, also referred to as fill patterns, are added in order to maintain an even distribution of design levels across a chip, which reduces the potential for defects on the chip or die due to, for example, uneven chemical mechanical planarization or polishing during the manufacturing process. Additionally, the filler cells 106 can be employed to obtain selected percentages of coverage for layers, such as metal layers, polysicon, and the like and for other processes such as diffusion.

Figure 1C:
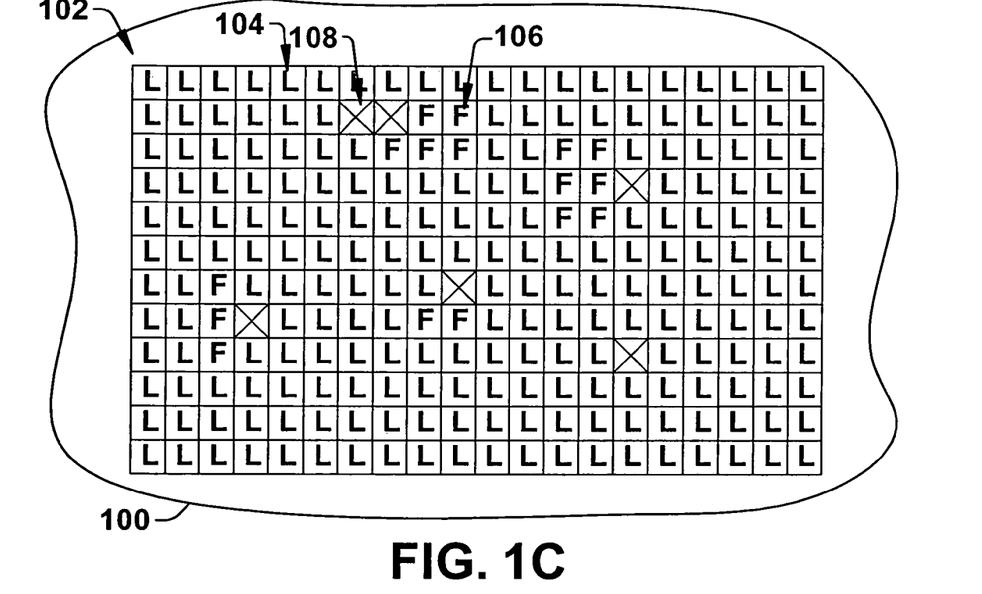
FIG. 1C is yet another diagram illustrating a cell map for the integrated circuit with critical cells identified in accordance with an aspect of the invention.

FIG. 1C is yet another diagram illustrating the cell map 100 for the integrated circuit with critical cells identified in accordance with an aspect of the invention. The cell map 100 is similar to that described with respect to FIG. 1B and is provided for illustrative purposes and is provided as merely an example of possible cell maps that can be employed in accordance with aspects of the invention.

FIG. 1C depicts a number of critical cells 108 that are identified. The critical cells 108 correspond to devices, circuits, and/or paths that lie along critical paths and/or impact overall performance of the integrated circuit. As an example, one of the critical cells 108 can correspond to an op amp that substantially impacts performance of the integrated circuit. The critical cells 108 typically have standard contact spacings and arrangements that do not necessarily yield desired performance due to contact resistance and/or contact capacitance.

Figure 1D:
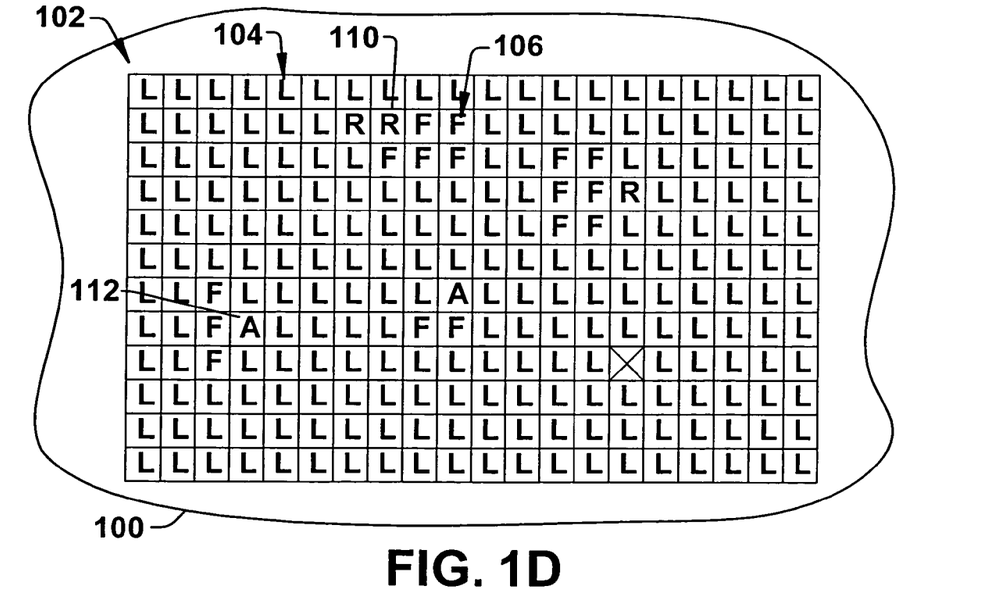
FIG. 1D is another diagram illustrating a cell map for the integrated circuit with replacement and altered cells in accordance with an aspect of the invention.

FIG. 1D is yet another diagram illustrating the cell map 100 for the integrated circuit with replacement and altered cells in accordance with an aspect of the invention. The cell map 100 is similar to that described with respect to FIG. 1C and is provided for illustrative purposes and is provided as merely an example of possible cell maps that can be employed in accordance with aspects of the invention.

Some of the critical cells 108 are replaced with replacement cells 110 or altered cells 112. The replacement cells 110 have similar functionality as the cells which they replace, but typically have lower parasitics, such as lower contact resistance and/or contact capacitance. These lower valued can be obtained by greater contact size, contact spacing, contact go gate spacing, and the like. The altered cells 112 are altered version of the critical cells they replace. Generally, the altered cells 112 are obtained by, for example, increasing contact to contact spacing, increasing contact to gate spacing, increasing contact size, and the like.

The replacement cells 110 and the altered cells 112 can employ proximate filler cells 106 in order to reduce contact resistance and/or contact capacitance. For example, an altered cell can be increased in size or area in order to improve performance by using at least a portion of a neighbouring filler cell. As another example, contacts in an altered cell can be moved toward a neighbouring filler cell because the moved contact will not impact performance, such as inter-cell parasitics, with the neighbouring filler cell.

Figure 2A:
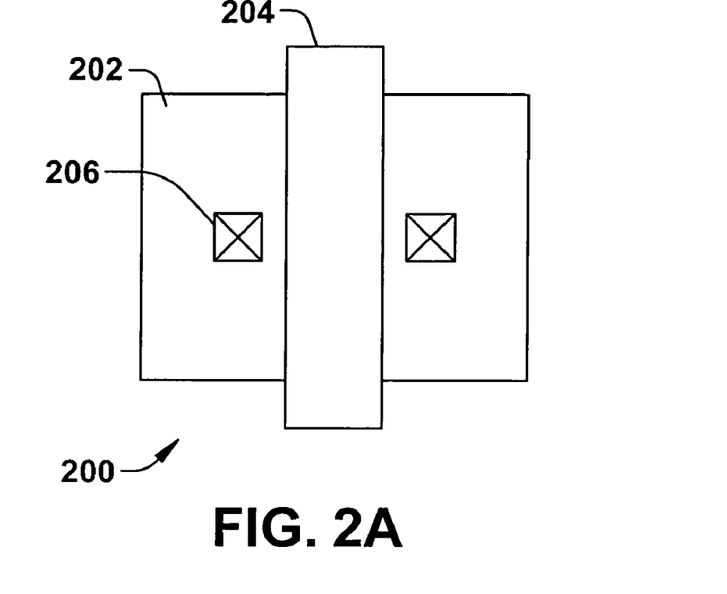
FIG. 2A is a diagram illustrating an example of a library cell in accordance with an aspect of the invention.

FIG. 2A is a diagram illustrating an example of a library cell 200 in accordance with an aspect of the invention. The cell 200 is provided for illustrative purposes and is provided as an example. The invention contemplates employing other types and configurations of library cells.

The cell 200 includes an active region 202 that can comprise source regions, drain regions, dielectric layers, and the like. Contacts 206 provide electrical connections to regions and/or components formed in the active region 202. A gate 304 is depicted between the two contacts 206.

The cell 200 has relatively short contact to contact spacing and contact to gate spacing. This short spacing can yield increased contact resistance and negatively impact performance. For example, the relatively short contact to gate spacing can result in intra-cell parasitic capacitance.

Figure 2B:
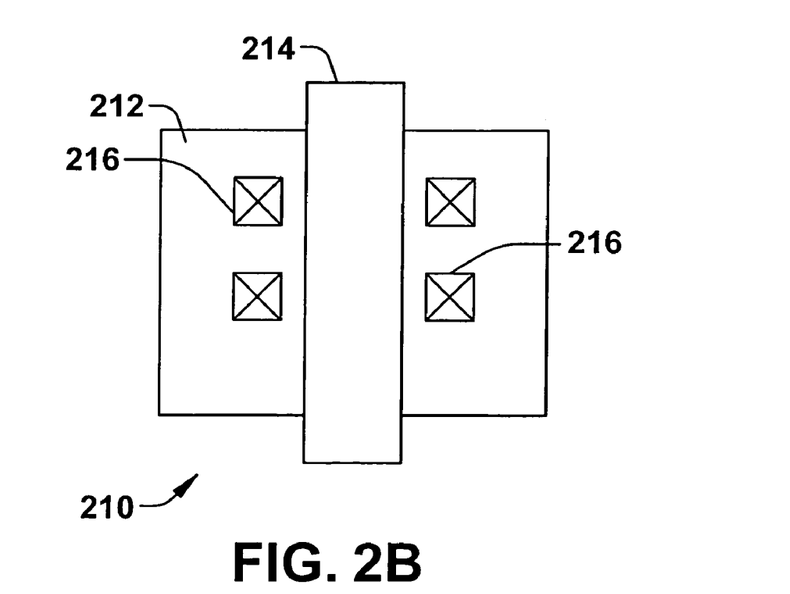
FIG. 2B is a diagram illustrating an example of another library cell in accordance with an aspect of the invention.

FIG. 2B is a diagram illustrating an example of another library cell 210 in accordance with an aspect of the invention. The cell 210 is provided for illustrative purposes and is provided as an example. The invention contemplates employing other types and configurations of library cells.

The cell 210 includes an active region 212 that can comprise, for example, source regions, drain regions, dielectric layers, silicide regions, and the like. Four contacts 216 are present that provide electrical connections to components and/or layers formed in the active region 212. Here, the contact to contact spacing is relatively short, which can result in unwanted intra-cell contact resistance and/or contact capacitance. Additionally, contact to gate spacing is also relatively short, which can negatively impact performance.

Figure 3A:
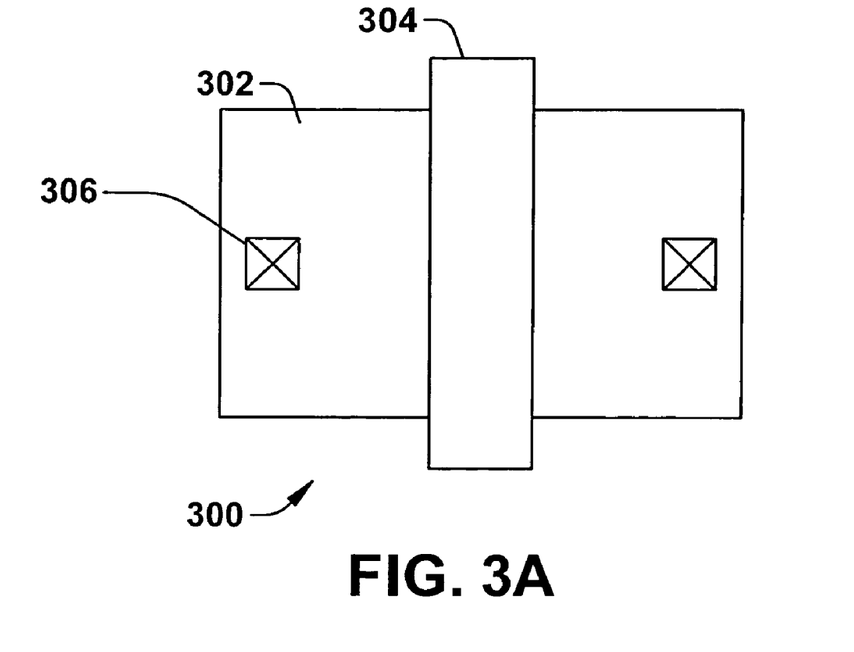
FIG. 3A is a diagram illustrating an example replacement or altered cell in accordance with an aspect of the invention.

FIG. 3A is a diagram illustrating an example replacement or altered cell 300 in accordance with an aspect of the invention. The cell 300 can be an altered form of or a replacement for the cell 200 of FIG. 2A. The cell 300 is provided for illustrative purposes and is provided as an example. The invention contemplates employing other types and configurations of library cells.

The cell 300 includes an active region 302 that can comprise source regions, drain regions, dielectric layers, and the like. Contacts 306 provide electrical connections to regions and/or components formed in the active region 302. A gate 304 is depicted between the two contacts 306.

The cell 300 has relatively long contact to contact spacing and contact to gate spacing, particularly when compared with the cell 300 of FIG. 2A. This long spacing can yield reduced contact resistance and improve performance of the cell 300.

Figure 3B:
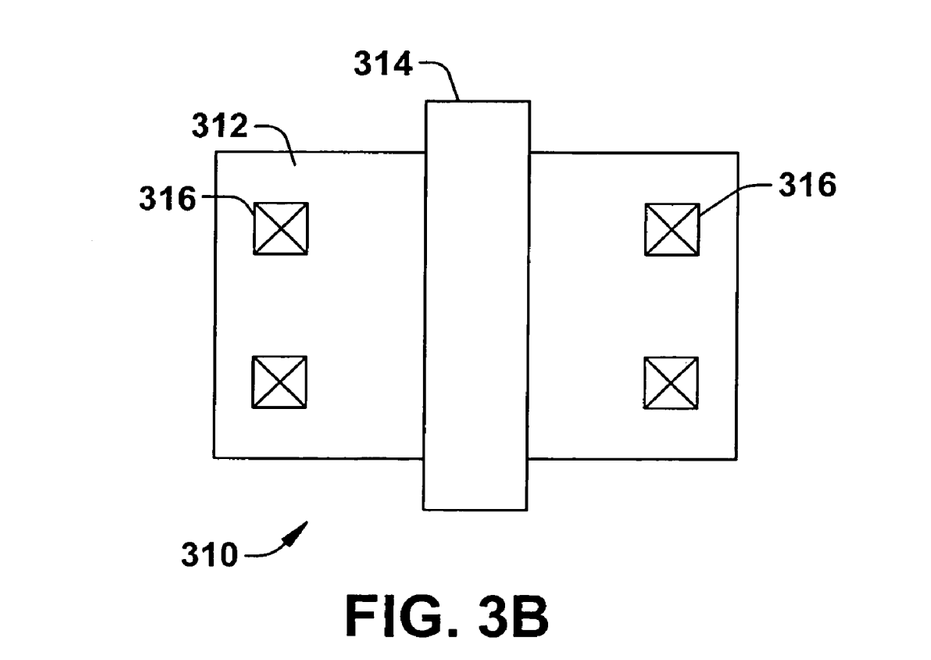
FIG. 3B is a diagram illustrating an example of another altered or replacement cell in accordance with an aspect of the invention.

FIG. 3B is a diagram illustrating an example of another altered or replacement cell 310 in accordance with an aspect of the invention. The cell 310 is provided for illustrative purposes and is provided as an example. The invention contemplates employing other types and configurations of library cells.

The cell 310 includes an active region 312 that can comprise, for example, source regions, drain regions, dielectric layers, silicide regions, and the like. Four contacts 316 are present that provide electrical connections to components and/or layers formed in the active region 312. Here, the contact to contact spacing is relatively long, which can result in lowered contact resistance and/or contact capacitance, particularly when compared with the device 210 of FIG. 2B. Additionally, contact to gate spacing for the cell 310 is also relatively long, which can positively impact performance.

Figure 4:
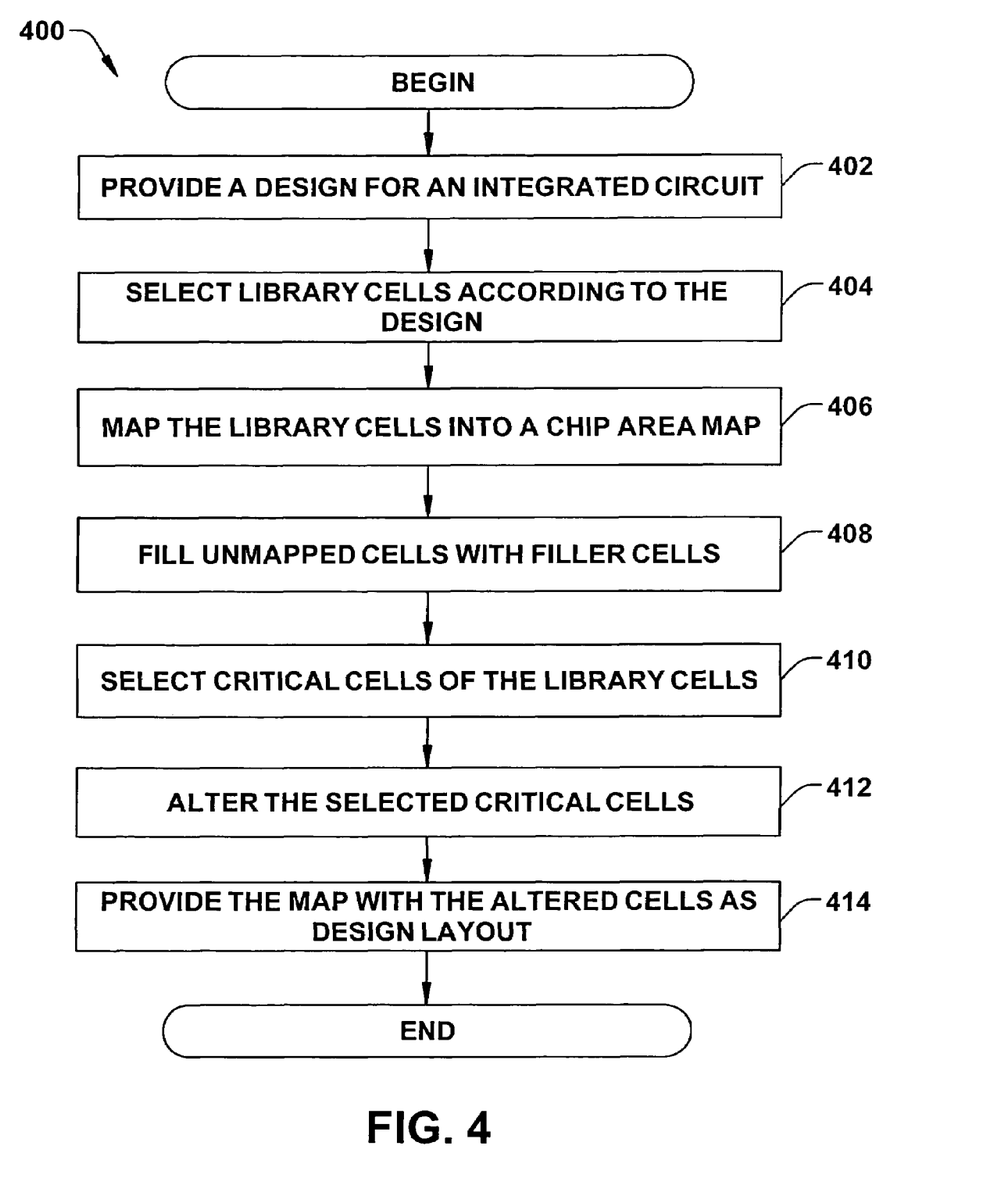
FIG. 4 is a flow diagram illustrating a method of improving circuit performance for an integrated circuit in accordance with an aspect of the present invention.

FIG. 4 is a flow diagram illustrating a method 400 of improving circuit performance for an integrated circuit in accordance with an aspect of the present invention. The method 400 synthesises placement of standard library cells and filler cells and then replaces a select number of cells in order to facilitate circuit performance.

The method 400 can be better appreciated with reference to the discussions provided above and in view of the foregoing structural and functional features described supra and infra. Additionally, the method 400 is depicted and described as executing serially, but it is to be understood and appreciated that the method 400 is not limited to the illustrated order, as some aspects could, in accordance with the present invention, occur in different orders and/or concurrently with other aspects from that depicted and described herein. Moreover, not all illustrated features may be required to implement a methodology in accordance with an aspect the present invention.

Performance of an integrated circuit is dependent upon performance of the individual cells within the integrated circuit. The performance of the individual cells depends upon resistance and capacitance properties of the cells. Many cells employed in design layouts typically have parasitic properties that negatively impact performance in the form of contact resistance and/or contact capacitance. These parasitic properties can be arranged in intra-cell parasitics, which are within library cells and inter-cell parasitics, which are parasitics between library cells. The intra-cell parasitics comprise parasitic capacitance from, for example, contact to gate, polysilicon layers, metal layer parasitics for one or more metal layers and the like. The intra-cell parasitics comprise parasitic resistance from, for example, contacts, vias, polysilicon layers, one or more metallization layers, and the like. The inter-cell parasitics comprise parsitic capacitance, for example, resulting from multiple metallization layers and the like. The inter-cell parasitics comprise parasitic resistance, for example, from multiple metallization layers, vias, contacts, and the like. The parasitics of cells can be a significant portion of the overall resistance and capacitance properties of cells. For example, the parasitics can comprise more then half of the total resistance and/or capacitance in one example.

The method 400 begins at block 402 wherein a design for an integrated circuit is provided. The design includes one or more of the following: logic circuits, memory devices, transistors, inverters, operational amplifiers, logic gates, and the like.

Library cells are selected at block 404 according to the design for the integrated circuit. The library cells have a suitable form factor for placement in a layout or map. The library cells are selected at least partially according to components and/or circuits present in the initial design. For example, a library cell can be selected for a logic circuit and another library cell can be selected for an operational amplifier, and the like. For example, there are buffer cells, inverter cells, transistor cells, and the like that may comprise the library cells. Some examples of other library cells include, for example, cells for flip-flops, register files, complex logic functions and custom macros.

The library cells are then mapped into areas or regions of a chip area map for the integrated circuit at block 406. The map includes a number of possible cell locations, also referred to as vacant or unmapped cells. At this point, the possible cell locations can be filled with library cells. However, some unmapped cells may remain. Continuing, at block 408, unmapped cells are mapped with filler cells to yield an initial design layout. The filler cells are not necessary for operation of the integrated circuit, however the filler cells facilitate fabrication of the integrated circuit by mitigating fabrication defects, for example, dishing that may occur without filler cells.

One or more critical cells are selected from the library cells at block 410 according to a critical path. The critical cells can be selected by identifying paths of the integrated circuit design that substantially impact performance. For example, the limiting or critical component for a circuit could be a particular transistor. Reducing parasitics, including contact resistance and/or contact capacitance for the particular transistor, in this example, leads to a direct improvement in performance of the integrated circuit. Continuing the example, a library cell for the particular transistor is identified as a critical cell. Identification of critical cells can be done based on architectural analysis and/or gate level or layout level analysis.

The selected critical cells are altered with respect to contact resistance and contact capacitance at block 412. The critical cells can be altered in a number of ways to improve performance. For example, contact to gate spacings and/or contact to contact spacings can be increased. In particular, the critical cells that are located about or proximate filler cells can be altered without impacting operations or performance of other library cells. Alternately, the critical cells can be replaced with lower contact cells that are functionally similar, but have lower contact resistance and/or contact capacitance.

A modified design layout is provided with the filler cells, library cells, and the altered critical cells at block 414. The modified design layout can be provided in the form of a chip area map that includes the filler cells, library cells, and the altered critical cells. The modified design layout typically provides improved performance over the initial design layout due to the presence of the altered critical cells.

Subsequently, the integrated circuit can be fabricated according to the modified design layout.

Figure 5:
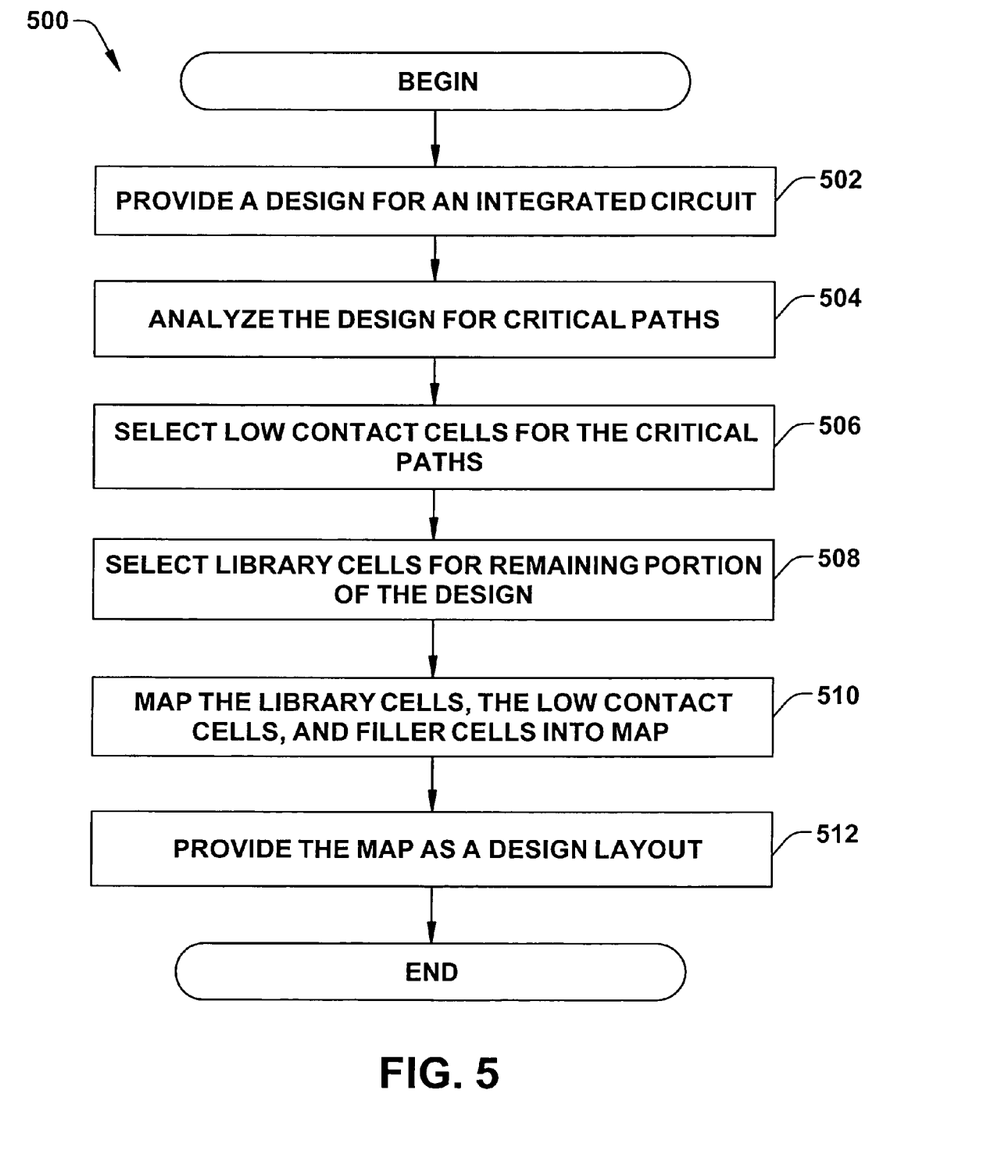
FIG. 5 is a flow diagram of another method of facilitating circuit performance for an integrated circuit in accordance with an aspect of the present invention.

FIG. 5 is a flow diagram of another method 500 of facilitating circuit performance for an integrated circuit in accordance with an aspect of the present invention. The method 500 employs low contact cells for critical paths instead of standard library cells in order to facilitate circuit performance.

The method 500 can be better appreciated with reference to the discussions provided above and in view of the foregoing structural and functional features described supra and infra. Additionally, the method 500 is depicted and described as executing serially, but it is to be understood and appreciated that the method 500 is not limited to the illustrated order, as some aspects could, in accordance with the present invention, occur in different orders and/or concurrently with other aspects from that depicted and described herein. Moreover, not all illustrated features may be required to implement a methodology in accordance with an aspect the present invention.

The method 500 begins at block 502 wherein a design for an integrated circuit is provided. The design includes one or more of the following: logic circuits, memory devices, transistors, inverters, operational amplifiers, logic gates, and the like.

The design is analyzed at block 504 to identify critical path(s). The critical paths can, in one example, be identified as paths of the integrated circuit design that substantially impact performance. For example, the limiting or critical component for a circuit could be a particular transistor. Reducing contact resistance and/or contact capacitance for the particular transistor, in this example, leads to a direct improvement in performance of the integrated circuit.

Low contact critical cells are selected for the identified critical paths at block 506. The low contact critical cells have spacings and/or cell configurations that provide lower contact resistance and/or contact capacitance than standard library cells. For example, the low contact critical cells may have longer contact to gate spacings than standard library cells.

Library cells are selected for remaining paths of the circuit design at block 508. The remaining paths can include paths that are not performance critical in that standard contact locations and spacings are sufficient and alteration does not yield substantial performance improvement for the integrated circuit. The library cells, the low contact cells, and filler cells are mapped or placed into regions of a chip area map for the integrated circuit at block 510. The mapping or placing of the library cells and the low contact cells typically allows for portions of the filler cells to be located proximate to the low contact cells.

The chip area map is provided as a design layout for the integrated circuit at block 512. The design layout can provide better performance than conventional design layouts because the low contact critical cells have been employed.

Subsequently, the integrated circuit can be fabricated according to the design layout provided at block 512.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. The term "exemplary" as used herein is intended to imply an example and not a best solution or implementation. Furthermore, to the extent that the terms "including", "includes", "having", "has", "with", or variants thereof are used in either the detailed description and the claims, such terms are intended to be inclusive in a manner similar to the term "comprising."

What is claimed is:

1. A method for generating a layout comprising:
   providing a design for an integrated circuit;
   selecting library cells according to the design;
   mapping the library cells into a chip area map;
   filling unmapped cells of the chip area map with filler cells
       analyzing paths of the design to identify critical paths;
   selecting critical cells of the library cells according to the identified critical paths, the critical cells including semiconductor components;
   altering the selected critical cells based on the filler cells proximate to the selected critical cells to reduce contact resistance and/or contact capacitance of the selected critical cells; and
   providing an altered chip area map having the altered cells.

2. The method of claim 1, wherein selecting the library cells comprises selecting library cells for transistor components.

3. The method of claim 1, wherein selecting the library cells comprises selecting library cells according to circuit paths of the design.

4. The method of claim 1, wherein selecting the critical cells comprises analyzing the design to identify critical components and selecting library cells corresponding to the identified critical components.

5. The method of claim 1, wherein altering the selected critical cells comprises replacing the selected critical cells with substitute cells having a lower contact resistance and/or contact capacitance.

6. The method of claim 1, wherein altering the selected critical cells comprises altering spacings for the critical cells.

7. The method of claim 6, wherein altering the spacings comprises increasing contact to contact spacing.

8. The method of claim 6, wherein altering the spacings comprises increasing contact to gate spacing.

9. The method of claim 6, wherein altering the spacings comprises increasing contact size.

10. The method of claim 1, wherein altering the selected critical cells comprises reducing intra-cell parasitics.

11. The method of claim 1, wherein altering the selected critical cells comprises reducing inter-cell parasitics.

* * * * *